United States Patent
Lin et al.

(10) Patent No.: US 10,090,897 B2
(45) Date of Patent: Oct. 2, 2018

(54) COMMUNICATION SYSTEM AND CHANNEL ESTIMATING METHOD THEREOF

(71) Applicant: NATIONAL CHIAO TUNG UNIVERSITY, Hsinchu (TW)

(72) Inventors: David W. Lin, Hsinchu (TW); Yen-Kai Wang, Changhua County (TW); Yu-Sheng Guo, Yunlin County (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 15 days.

(21) Appl. No.: 15/099,605

(22) Filed: Apr. 15, 2016

(65) Prior Publication Data
US 2017/0302344 A1    Oct. 19, 2017

(51) Int. Cl.
  H04B 7/0456    (2017.01)
  H04L 25/02     (2006.01)

(52) U.S. Cl.
  CPC ....... H04B 7/0456 (2013.01); H04L 25/0208 (2013.01)

(58) Field of Classification Search
  CPC ............................ H04B 7/0456; H04L 25/0242
  USPC ................. 375/260, 267, 295; 370/252, 329
  See application file for complete search history.

(56) References Cited

U.S. PATENT DOCUMENTS

| 8,233,517 | B2  | 7/2012 | Grant   |            |
|-----------|-----|--------|---------|------------|
| 8,457,236 | B2* | 6/2013 | Gomadam | H04B 7/0417|
|           |     |        |         | 375/260    |
| 2010/0265841 | A1* | 10/2010 | Rong | H04L 5/0023 |
|           |     |        |         | 370/252    |
| 2013/0267240 | A1* | 10/2013 | Fu | H04L 1/0026 |
|           |     |        |         | 455/452.2  |
| 2014/0286290 | A1* | 9/2014 | Nagata | H04L 1/0026 |
|           |     |        |         | 370/329    |

(Continued)

FOREIGN PATENT DOCUMENTS

| CN | 101232317 B | 3/2013 |
| TW | I365631     | 6/2012 |

OTHER PUBLICATIONS

Yen-Kai Wang et al., "Multi-user MIMO Channel Estimation with Multiple CSI Feedbacks in An LTE-Like Scenario" IEEE Vehicular Technology Conference, May 11-14, 2015.

(Continued)

*Primary Examiner* — Chieh M Fan
*Assistant Examiner* — Fitwi Hailegiorgis
(74) *Attorney, Agent, or Firm* — CKC & Partners Co., Ltd.

(57) ABSTRACT

A communication system includes at least one transmitting unit and at least one receiving unit. The at least one transmitting unit is configured to transmit at least one input signal after precoding it with at least one precoding matrix. The at least one receiving unit wirelessly coupled with the at least one transmitting unit is configured to receive the at least one precoded input signal, and generate at least one channel quality signal corresponding to the at least one precoded input signal, in which the at least one transmitting unit generates at least one magnitude information estimate or at least one phase information estimate or at least one of both for at least one channel state information according to the at least one channel quality signal, the at least one precoding matrix and at least one noise size signal.

20 Claims, 4 Drawing Sheets

(56) References Cited

U.S. PATENT DOCUMENTS

2015/0009929 A1* 1/2015 Park ................ H04B 7/024
                                                        370/329
2015/0229456 A1* 8/2015 Wild ................ H04B 7/024
                                                        375/295

OTHER PUBLICATIONS

Ohyun Jo et al., "Holistic Design Considerations for Environmentally Adaptive 60 GHz Beamforming Technology", IEEE Communications Magazine, Nov. 2014, pp. 30-38.

Thomas Nitsche et al., "IEEE 802.11ad: Directional 60 GHz Communication for Multi-Gigabit-per-Second Wi-Fi", IEEE Communications Magazine, Dec. 2014, pp. 132-141.

Joonsuk Kim et al., "802.11 WLAN: History and New Enabling MIMO Techniques for Next Generation Standards", IEEE Communications Magazine, Mar. 2015, pp. 134-140.

* cited by examiner

COMMUNICATION SYSTEM AND CHANNEL ESTIMATING METHOD THEREOF

BACKGROUND

Technical Field

The present disclosure relates to a communication system and a channel estimating method thereof. More particularly, the present disclosure relates to a communication system, which can estimate transmission channel based on channel quality information, and a channel estimating method thereof.

Description of Related Art

Recently, multi-input multi-output (MIMO) transmission techniques are widely used in communication systems. In many MIMO transmission systems, a receiver is configured to feedback some information to the transmitter, where the feedback information may include rank indicator (RI), precoding matrix indicator (PMI) and channel quality indicator (CQI). The transmitter can set up a precoding matrix according to the above feedback information. It is noted that the term "indicator" referred to above, which has been abbreviated as "I" in the shorthands "RI," "PMI," and "CQI," is sometimes termed "indication" or "index" with the same abbreviation "I."

However, utilizing the information directly from the receivers to set up precoding matrices without further calculation can often lead to bad transmission performance because the feedback information itself frequently does not give an accurate characterization of the channel response directly. In order to achieve high transmission efficiency in a communication system, it is very important in this area to estimate the transmission channel well.

SUMMARY

The following presents a simplified summary of the disclosure in order to provide a basic understanding to the reader. This summary is not an extensive overview of the disclosure and it does not identify key/critical components of the present disclosure or delineate the scope of the present disclosure. Its sole purpose is to present some concepts disclosed herein in a simplified form as a prelude to the more detailed description that is presented later.

In one aspect, the present disclosure is to provide a communication system. The communication system includes at least one transmitting unit and at least one receiving unit. The at least one transmitting unit is configured to transmit at least one input signal after putting it through a precoding matrix. The at least one receiving unit wirelessly coupled with the at least one transmitting unit is configured to receive the at least one precoded input signal, and generate at least one channel quality signal corresponding to the at least one precoded input signal, in which the at least one transmitting unit generates at least one channel state information estimate according to the at least one channel quality signal, the at least one precoding matrix and at least one noise size signal. The at least one transmitting unit may then adjust at least one antenna setting for the transmission of at least another input signal according to the at least one channel state information estimate.

In another aspect, the present disclosure is to provide a channel estimating method suitable for a communication system. The channel estimating method includes the following steps: transmitting at least one input signal after putting it through a precoding matrix; receiving the at least one precoded input signal; generating at least one channel quality signal corresponding to the at least one precoded input signal; generating at least one channel state information estimate according to the at least one channel quality signal, the at least one precoding matrix, and at least one noise size signal. After the channel estimation, the communication system may adjust at least one antenna setting for the transmission of at least another input signal according to the at least one channel state information estimate.

By applying the techniques disclosed in the present disclosure, the channel state information estimate can be obtained using the channel quality signal. The channel state information estimate may include magnitude information estimate (i.e., magnitude response estimate) and phase information estimate (i.e., phase response estimate), and thus the transmission channel can be estimated.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Figure 1:
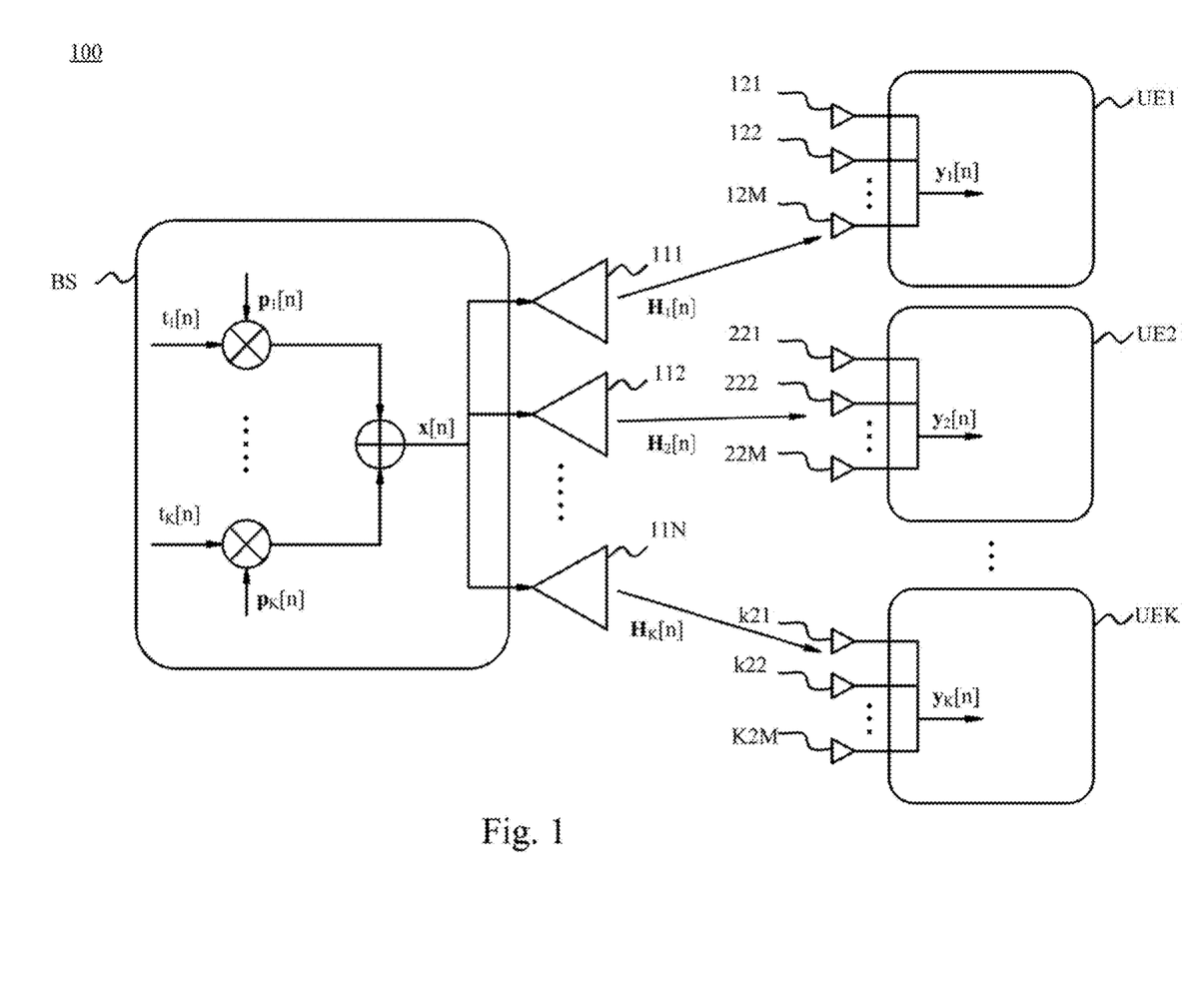
FIG. 1 is a schematic diagram of a communication system in accordance with one embodiment of the present disclosure.

Reference is made first to FIG. 1. FIG. 1 is a schematic diagram of a communication system 100 in accordance with one embodiment of the present disclosure. In this embodiment, the communication system 100 can be utilized in an established communication technology such as the Long-Term Evolution (LTE) technology, but the communication system 100 can be utilized in other communication technology in other embodiments, and the present disclosure is not limited in this regard. As shown in FIG. 1, the communication system 100 includes a base station BS and user equipments UE1~UEK. The base station BS includes transmitting units 111~11N, in which N is an integer bigger than 0, and the transmitting units 111~11N can be transmitting antennas or any other equivalent transmitting units. The user equipment UE1 includes receiving units 121~12M, and the user equipment UE2 includes receiving units 221~22M, and in this manner the user equipment UEK includes receiving units K21~K2M, in which M and K are integers bigger than 0, the user equipments UE1~UEK can be mobile phones, panels, laptops or any other user equipments, and the receiving units 121~12M, 221~22M, ..., K21~K2M can be receiving antennas or any other equivalent receiving units. It should be noted that, the abovementioned N, K and M can be any integers bigger than 0, that is to say, the communication system 100 can include at least one transmitting unit 111 and at least one receiving unit 121 in some embodiments, and the present disclosure is not limited to this regard.

In this embodiment, the transmitting units 111~11N are configured to transmit input signals $t_1[n]$~$t_K[n]$ through the precoding vectors $p_1[n]$~$p_K[n]$. The receiving units 121~12M, 221~22M, ..., K21~K2M are wirelessly coupled with the transmitting units 111~11N. The receiving units 121~12M, 221~22M, ..., K21~K2M are configured to receive the input signals $t_1[n]$~$t_K[n]$ that have been precoded by the precoding vectors $p_1[n]$~$p_K[n]$, and generate channel quality signals $C_1[n]$~$C_K[n]$ (not depicted in FIG. 1) corresponding to the precoding vectors $p_1[n]$~$p_K[n]$. The base station BS generates channel state information estimates $\hat{H}_1[n]$~$\hat{H}_K[n]$ according to the channel quality signals $C_1[n]$~$C_K[n]$, the precoding vectors $p_1[n]$~$p_K[n]$ and noise size signals corresponding to noises $z_1[n]$~$z_K[n]$, and the transmitting units 111~11N may then adjust the antenna settings for the transmission of another set of input signals $t_1[n']$~$t_K[n']$ for some other n' according to the channel state information estimates $\hat{H}_1[n]$~$\hat{H}_K[n]$. As a vector can be considered a special kind of matrix which contains only one column, in what follows a vector may be either referred to as a vector or a matrix, depending on convenience.

For further explanation, in this embodiment, $t_k[n]$ is the signal transmitted to the user equipment UEk at time n, and $p_k[n]$ is the corresponding precoding matrix (or precoding vector). The transmitted signal x[n] of the base station BS at time n is thus given by formula (1) as shown below:

$$x[n] = \sum_{k=1}^{K} p_k[n] t_k[n] = P[n] t[n] \quad (1)$$

In which, $P[n]=[p_1[n]\ p_2[n]\ \ldots\ p_K[n]]$, and $t[n]=[t_1[n]\ t_1[n]\ t_2[n]\ \ldots\ t_K[n]]'$ with ' denoting matrix and vector transpose. Then the received signal vector at the user equipment UEk is given by formula (2) as shown below:

$$y_k[n] = H_k[n] x[n] + z_k[n] = H_k[n] \sum_{u=1}^{K} p_u[n] t_u[n] + z_k[n] \quad (2)$$

In which, $H_k[n]$ is an M×N channel matrix (i.e., the channel state information) between the transmitting units 111~11N of the base station BS and the receiving units k21~k2M of the user equipment UEk, and $z_k[n]$ is a noise vector. Denote the (r,s)th entry of $H_k[n]$ by $h_{krs}[n] e^{j\theta_{krs}[n]}$, in which 0≤r<M and 0≤s<N. $h_{krs}[n]$ and $\theta_{krs}[n]$ are magnitude information (i.e., magnitude response) and phase information (i.e., phase response) of the channel state information from the sth transmitting unit to the rth receiving unit of the user equipment UEk, respectively.

It should be noted that, in this embodiment, the communication system 100 may make use of the rank indication (RI), precoding matrix indication (PMI), and channel quality indication (CQI), which are fed back from the user equipments UE1~UEK to do the estimation work. In particular, the CQI is typically related to the signal-to-interference-plus-noise ratio (SINR) given by formula (3) as shown below:

$$Q_k[n] = \frac{\|H_k[n] p_k[n]\|^2}{\sigma_k^2 + \sum_{u=1, u \neq k}^{K} \|H_k[n] p_u[n]\|^2} \quad (3)$$

In which, $Q_k[n]$ is the SINR at UEk at time n and $\sigma_k^2$ is the noise size signal for UEk. A highly accurate (effectively very close to being of infinite precision) or a highly quantized value of the CQI may be fed back. The communication system 100 can work with any kind of SINR-related CQI feedback. In the above and following description, the channel quality signals $C_k[n]$ will be used to indicate the fed back value of the CQI. In some embodiments, $C_k[n]$ is a quantized version of the SINR $Q_k[n]$ or its estimate.

For ease of illustration, the following utilizes a special embodiment of the communication system 100 with N=4, K=4 and M=1. That is, the base station BS has 4 transmitting units 111~114 and each of the user equipments UE1~UE4 has a single receiving units 121~421. In other embodiments, N, K and M can be any integers bigger than 0, and the present disclosure is not limited in this regard.

In this embodiment, each of the transmitting units 111~11N generates magnitude information estimates of the channel state information $H_1[n]$~$H_K[n]$ according to the channel quality signals $C_1[n]$~$C_K[n]$ corresponding to first type precoding matrices P[n]. For further explanation, to estimate the magnitude information of the channel state information $H_1[n]$~$H_K[n]$, the base station BS transmits at least one input signal through N first type precoding matrices P[n], say, for $0 \le n < N-1$, and $P[n]=Q^n$, in which Q is given by formula (4) as shown below:

$$Q = \begin{bmatrix} 0 & 0 & 0 & 1 \\ 1 & 0 & 0 & 0 \\ 0 & 1 & 0 & 0 \\ 0 & 0 & 1 & 0 \end{bmatrix} \quad (4)$$

In other words, Q is an identity matrix with all its rows shifted downwards circularly by one position. It is easily seen that this setting is not limited to N=4, but can be applied to any value of N. The associated CQI feedbacks $C_k[n]$ are quantized versions of the SINR $Q_k[n]$ given by formula (5) shown below:

$$Q_k[n] = \frac{h^2_{k0[(n+k-1)\% N]}[n]}{\sigma_k^2 + h^2_{k0[(n+k)\% N]}[n] + h^2_{k0[(n+k+1)\% N]}[n] + \ldots + h^2_{k0[(n+k+N-2)\% N]}[n]} \quad (5)$$

for $0 \le n \le N-1$ for each k, in which % denotes the modulo operation and the third subscript to h has been placed in brackets to clearly delineate its extent due to the length of its mathematical expression. Suppose each $h_{krs}[n]$ does not vary over $0 \le n \le N-1$ and hence one may drop the time designation n in $h_{krs}[n]$ for simplicity. Then substituting $C_k[n]$ for $Q_k[n]$ and moving terms, the last equation can be rewritten as formula (6) as shown below:

$$\begin{bmatrix} 1 & -C_k[0] & -C_k[0] & \ldots & -C_k[0] \\ -C_k[1] & 1 & -C_k[1] & \ldots & -C_k[1] \\ -C_k[2] & -C_k[2] & 1 & -C_k[2] & -C_k[2] \\ \vdots & \vdots & & \ddots & \vdots \\ -C_k[N-1] & -C_k[N-1] & \ldots & -C_k[N-1] & 1 \end{bmatrix} \quad (6)$$

$$\begin{bmatrix} a_{k0} \\ a_{k1} \\ a_{k2} \\ \vdots \\ a_{k(N-1)} \end{bmatrix} = \sigma_k^2 \begin{bmatrix} C_k[0] \\ C_k[1] \\ C_k[2] \\ \vdots \\ C_k[N-1] \end{bmatrix}$$

in which $\alpha_{ks} = h_{k0[(s+k-)\% N1]}^2$, $1 \le k \le N$, $0 \le s \le N-1$. The desired magnitude information estimate for $h_{k0s}$, for the user equipment UEk can thus be solved by solving the system of linear equation (6) for $\alpha hd_{ks}$ and taking the square roots thereof. It is easily seen that for the user equipment UEk with more than one receiving units (i.e., with M>1), the similar way can be used to obtain estimates of the magnitude information $h_{krs}$ for all $0 < r < M$. It can be seen, in this case, that if the CQI feedbacks $C_k[n]$ are equal to $Q_k[n]$ with no quantization error, then the magnitude information estimates do not contain any estimation error. In general, the magnitude information estimates may contain estimation errors. This is the case, for example, when one uses the square roots of the solution to equation (6) as the magnitude information estimates for $h_{krs}[n]$ when $h_{krs}[n]$ is not time-invariant over $0 \le n \le N-1$. Nevertheless, such estimates, though not fully accurate, do not cease to be viable estimates for use in a communication system. For convenience, denote the estimate of the magnitude information $h_{krs}[n]$ by $\hat{h}_{krs}[n]$. And in the case where a magnitude information estimate does not vary with n, such as that obtained from taking the square roots of the solution to equation (6) over $0 \le n \le N-1$, the time designation n in $\hat{h}_{krs}[n]$ may be omitted.

Besides, in this embodiment, each of the transmitting units 111~11N generates phase information estimates of the channel state information $H_1[n]$~$H_K[n]$ according to the channel quality signals $C_1[n]$~$C_K[n]$ corresponding to second type precoding matrices P[n]. For further explanation, to estimate the phase information of the channel state information $H_1[n]$~$H_K[n]$, the base station BS transmits at least one input signal through N second type precoding matrices P[n] for N time instants indexed by n, say $N \le n < 2N$. In one embodiment, let $P[n]=Q^n+Q^{n+1}$, which yields, in the case of N=4, for example, given by formula (7) as shown below:

$$P[N] = \begin{bmatrix} 1 & 0 & 0 & 1 \\ 1 & 1 & 0 & 0 \\ 0 & 1 & 1 & 0 \\ 0 & 0 & 1 & 1 \end{bmatrix} \quad (7)$$

and, for $N+1 \le n \le 2N-1$, P[n] are simply (n−N)-fold circularly downwards shifted versions of P[N]. The associated CQI feedbacks are given by quantized versions of the SINR $Q_k[n]$ as given by formula (8) as shown below:

$$Q_k[n] = \frac{v_k[n]}{\mu_k[n]} \quad (8)$$

In which, assuming that all the magnitude information $h_{krs}[n]$ and phase information $\theta_{krs}[n]$ do not vary over $N+1 \le n \le 2N-1$ and thus dropping the time designation n in $h_{krs}[n]$ and $\theta_{krs}[n]$ for simplicity, $$v_k[n] = |h_{k0[(n+k-1)\% N]} e^{j\theta_{k0[(n+k-1)\% N]}} + h_{k0[(n+k)\% N]} e^{j\theta_{k0[(n+k)\% N]}}|^2$$
$$= h^2_{k0[(n+k-1)\% N]} + h^2_{k0[(n+k)\% N]} +$$
$$2h_{k0[(n+k-1)\% N]} h_{k0[(n+k)\% N]} \cos(\theta_{k0[(n+k-1)\% N]} - \theta_{k0[(n+k)\% N]}),$$

-continued $$\mu_k[n] = \sigma_k^2 + |h_{k0[(n+k)\% N]}e^{j\theta_{k0[(n+k)\% N]}} + h_{k0[(n+k+1)\% N]}e^{j\theta_{k0[(n+k+1)\% N]}}|^2 +$$
$$\left|\begin{array}{l}h_{k0[(n+k+1)\% N]}e^{j\theta_{k0[(n+k+1)\% N]}} + \\ h_{k0[(n+k+2)\% N]}e^{j\theta_{k0[(n+k+2)\% N]}}\end{array}\right|^2 + \ldots +$$
$$\left|\begin{array}{l}h_{k0[(n+k+N-2)\% N]}e^{j\theta_{k0[(n+k+N-2)\% N]}} + \\ h_{k0[(n+k+N=1)\% N]}e^{j\theta_{k0[(n+k+N-1)\% N]}}\end{array}\right|^2$$
$$= \sigma_k^2 + h_{k0[(n+k)\% N]}^2 + 2(h_{k0[(n+k+1)\% N]}^2 + \ldots + h_{k0[(n+k+N-2)\% N]}^2) +$$
$$h_{k0[(n+k+N-1)\% N]}^2 +$$
$$2h_{k0[(n+k)\% N]}h_{k0[(n+k+1)\% N]}\cos(\theta_{k0[(n+k)\% N]} - \theta_{k0[(n+k+1)\% N]}) +$$
$$2h_{k0[(n+k+1)\% N]}h_{k0[(n+k+2)\% N]}\cos\left(\begin{array}{l}\theta_{k0[(n+k+1)\% N]} - \\ \theta_{k0[(n+k+2)\% N]}\end{array}\right) + \ldots +$$
$$2h_{k0[(n+k+N-2)\% N]}h_{k0[(n+k+N-1)\% N]}\cos\left(\begin{array}{l}\theta_{k0[(n+k+N-2)\% N]} - \\ \theta_{k0[(n+k+N-1)\% N]}\end{array}\right),$$

for $N+1 \leq n \leq 2N-1$ for each k. Substituting $C_k[n]$ for $Q_k[n]$ and moving terms can obtain, for each k, a system of N linear equations in the N unknowns $\cos(\theta_{k0[(s+k-1)\% N]} - \theta_{k0[(s+k)\% N]})$ as given by formula (9) as shown below:

$$\begin{bmatrix} 1 & -C_k[N] & -C_k[N] & \ldots & -C_k[N] \\ -C_k[N+1] & 1 & -C_k[N+1] & \ldots & -C_k[N+1] \\ -C_k[N+2] & -C_k[N+2] & 1 & -C_k[N+2] & -C_k[N+2] \\ \vdots & \vdots & & \ddots & \vdots \\ -C_k[2N-1] & -C_k[2N-1] & \ldots & & -C_k[2N-1] & 1 \end{bmatrix} \quad (9)$$

$$D \cdot \begin{bmatrix} b_{k0} \\ b_{k1} \\ b_{k2} \\ \vdots \\ b_{k(N-1)} \end{bmatrix} = \begin{bmatrix} c_{k0} \\ c_{k1} \\ c_{k2} \\ \vdots \\ c_{k(N-1)} \end{bmatrix}$$

In which, $b_{ks} = \cos(\theta_{k0[(s+k-1)\% N]} - \theta_{k0[(s+k)\% N]})$, $c_{ks} = C_k[s+N](\sigma_k^2 + h_{k0[(\alpha+k+)\% N]}^2 + 2\{h_{k0[(\alpha+k+1)\% N]}^2 + \ldots + h_{k0[(s+k+N-2)\% N]}^2\} + h_{k0[(\alpha+k+N-1)\% N]}^2) - (h_{k0[(s+k-1)\% N]}^2 + h_{k0[(s+k)\% N]}^2)$, and D is an N×N diagonal matrix whose sth diagonal term is given by $2h_{k0[(\alpha+k-1)\% N]}h_{k0[(\alpha+k)\% N]}$, with $0 \leq s < N$. Then, by taking the arc-cosines of the solution to the formula (9), a set of phase difference estimates for the phase information of the channel state information can be obtained. In solving equation (9), one may use the magnitude information estimates $\hat{h}_{krs}$ obtained from solving equation (6) in place of all the magnitude information values $h_{krs}$ in equation (9) to facilitate a solution. Even though the channel state information may not be time-invariant over $N+1 \leq n \leq 2N-1$, the estimates as obtained above do not cease to be viable estimates for use in a communication system. Accordingly, the channel state information can be estimated using the channel quality signals. The estimated channel state information may include magnitude information estimate and phase information estimate, and thus the transmission channel can be estimated.

In some embodiments, let $P[n] = Q^n + Q^{n+1}$ for $j = \sqrt{-1}$, for N time instants indexed by n, say $N \leq n < 2N$, which yields, in the case of N=4, for example, $$P[N] = \begin{bmatrix} 1 & 0 & 0 & j \\ j & 1 & 0 & 0 \\ 0 & j & 1 & 0 \\ 0 & 0 & j & 1 \end{bmatrix} \quad (10)$$

With this choice, a similar set of equations as that given in (7)-(9) can be obtained, except that various quantities that involve cosines of angle differences are changed to sines and the arc-cosines to be taken of the solution to (9) are changed to arc-sines.

In some embodiments, each of the transmitting units 111~11N generates the phase information estimates of the channel state information further according to at least one precoding matrix index from the K receiving units. For further explanation, one has to determine the sign of each phase difference. For this, one may enlist the help of the PMI feedback as follows. Let $\varphi_{krs}$ be the phase of the (r,s)th entry of the preferred precoding matrix associated with the user equipment UEk according to PMI feedback. Let $\beta_{krs}$ be the solution for $\cos(\theta_{krs} - \theta_{kr[(x+1)\% N]})$ obtained via the above method. Then one way to determine the signs of the phase differences is by performing the following optimization for each receiving units r of the user equipment UEk:

$$\{\hat{\psi}_{krs}\} = \operatorname{argmin}_{\{\psi_{krs}\}} \sum_{s=0}^{N-1} |\psi_{krs} + (\phi_{krs} - \phi_{kr[(s+1)\% N]})|^2 \quad (11)$$

subject to $\psi_{krs} \in \{\arccos \beta_{krs}, -\arccos \beta_{krs}\}$ for $0 \leq s \leq N$ and $\Sigma_{x=0}^{N-1} \psi_{krs} = 0$. The resulting set of $\hat{\psi}_{krs}$, together with the earlier set of magnitude information estimates $\hat{h}_{krs}$, may constitute the final channel estimates.

In some embodiments, let $P[n] = Q^n + Q^{n+1}$ for $N \leq n \leq 2N$ and let $P[n] = Q^n + jQ^{n+1}$ for $2N \leq n < 3N$. Then a combined consideration of the cosines of phase differences and the sines of phase differences can determine the signs of the phase differences without the optimization embodied in formula (11).

In addition, other kinds of precoding matrices P[n] may also be considered. For example, for $0 \leq n < N$, one may let $P[n] = Q^n T_m$ where $T_m$ may be a suitably chosen N×N nonsingular matrix (such as a unitary matrix) and for $N \leq n < 2N$, one may let $P[n] = (Q^n + Q^{n+1})T_p$ or $P[n] = (Q^n + jQ^{n+1})T_p$ where $T_p$ may be a suitably chosen N×N nonsingular matrix (such as a unitary matrix). The way to perform channel estimation is to disregard $T_m$ or $T_p$ first and carry out the previously outlined channel estimation process and then subject the results to an inverse of the transformation defined by $T_m$ or $T_p$.

In some embodiments, the magnitude relation (6) and phase difference relation (9) no longer hold in equality form, but each row of them holds at its associated time instant. This kind of embodiments can be used to address the potentially time-varying nature of the channel state information in a different fashion than the embodiments exemplified above. In particular, let the rows in a matrix be indexed starting from 0 on top. Then row n in (6) is changed to:

$$\left[ \underbrace{-C_k[n] \ldots -C_k[n]}_{n \text{ items}} \quad 1 \quad \underbrace{-C_k[n] \ldots -C_k[n]}_{N-n-1 \text{ items}} \right] \cdot a[n] = \sigma_k^2 C_k[n] \quad (12)$$

where $0 \leq n < N$ and $a[n] = [h_{k0[(k-1)\% N]}^2[n] \ldots h_{k0[(N+k-2)\% N]}^2[n]]'$, and row n−N in (9) is changed to:

$$\left[ \underbrace{-C_k[n] \ldots -C_k[n]}_{n-N \text{ items}} \quad 1 \quad \underbrace{-C_k[n] \ldots -C_k[n]}_{2N-n-1 \text{ items}} \right] \cdot D[n] \cdot b[n] = c_{k,n-N}[n] \quad (13)$$

where $N \leq n < 2N$, $b[n] = [\cos(\theta_{k0[(k+1)\% N]}[n]) - \theta_{k0[k \% N]}[n]) \ldots \cos(\theta_{k0[(N+k-2)\% N]}[n]) - \theta_{k0[(N+k-1)\% N]}[n])]'$, $c_{k,n-N}[n] = C_k([N](\sigma_k^2 + h_{k0[(n+k)\% N]}^2[n] + 2\{h_{k0[(n+k+1)\% N]}^2[n] + \ldots + h_{k0[(n+k+N-2)\% N]}^2[n]\} + h_{k0[(n+k+N-1)\% N]}^2[n]) - (h_{k0[(n+k-1)\% N]}^2[n] + h_{k0[(n+k)\% N]}^2[n])$, and D[n] is an N×N diagonal matrix whose sth diagonal term is given by $2h_{k0[(s+k-1)\% N]}[n]h_{k0[(s+k)\% N]}[n]$, $0 \leq s < N$. The channel estimation problem may be formulated as a constrained optimization problem as follows. Let the Hermitian transpose of the preferred precoding matrix for the user equipment UEk at time n, according to PMI feedback, be $H_k^{PMI}[n]$ with its (r,s)th entry given by $h_{k,rs}^{PMI}[n]e^{j\theta_{krs}^{PMI}[n]}$. Then in the estimation of the magnitude information, one may minimize $\|\hat{a} - a^{PMI}[N-1]\|$ over $\hat{a}$ subject to a limit on the disparity between the left-hand-side (LHS) and the right-hand-side (RHS) of (12) for $0 \leq n < N$ (where the disparity may be set to 0 at one or more n), in which $\hat{a}$ denotes an estimate of $a[N-1]$, and $a^{PMI}[n] = [(h_{k0[(k-1)\% N]}^{PMI}[n])^2 \ldots (h_{k0[(N+k-2)\% N]}^{PMI}[n])^2]'$, and the said disparity in (12) is evaluated with $\hat{a}$ in place of $a[n]$ for $0 \leq n < N$. Similarly, in the estimation of the phase information, one may minimize $\|\hat{b} - b^{PMI}[2N-1]\|$ over $\hat{b}$ subject to a limit on the disparity between the LHS and the RHS of (13) for $N \leq n < 2N$ (where the disparity may be set to 0 at one or more n), in which $\hat{b}$ denotes an estimate of $b[2N-1]$, $b^{PMI}[n] = [\cos(\theta_{k067 (k-1)\% N}^{PMI}[n] - \theta_{k0[k \% N]}^{PMI}[n]) \ldots \cos(\theta_{k0[(N+k-2)\% N]}^{PMI}[n] - \theta_{k0[(N+k-1)\% N]}^{PMI}[n])]'$, and the said disparity in (13) is evaluated with $\hat{b}$ in place of $b[n]$ for $N \leq n \leq 2N-1$ and with certain estimated magnitude information, such as the ones obtained in the previous step, in place of the corresponding quantities in (13).

Figure 2:
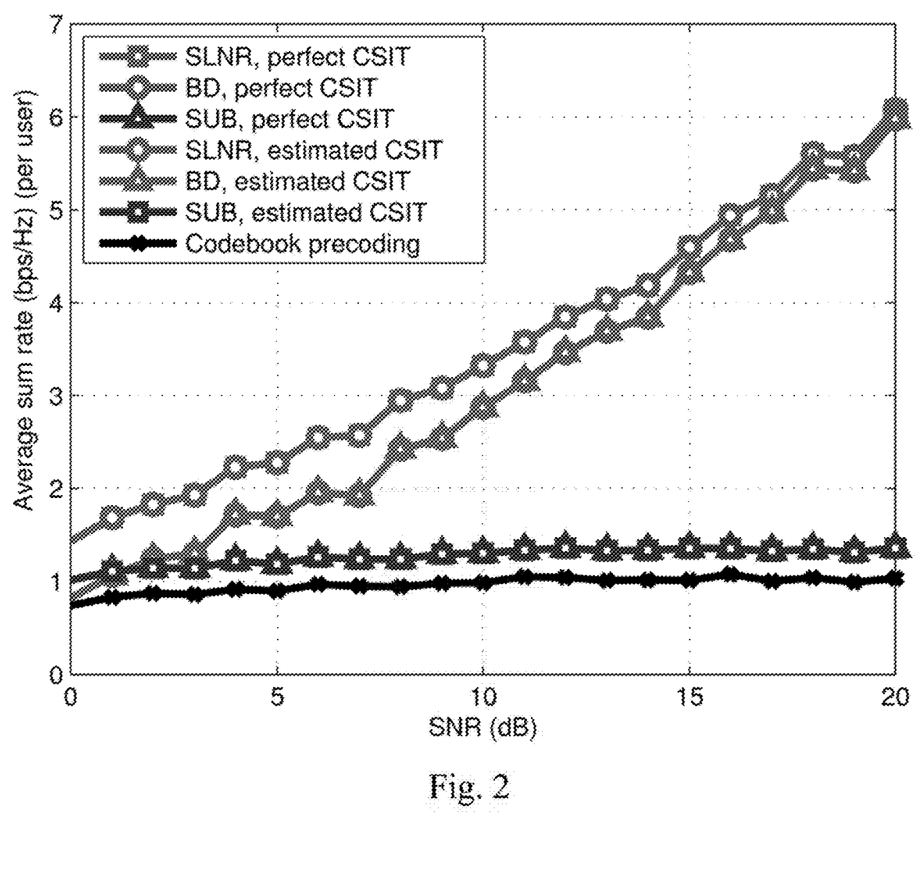
FIG. 2 is a schematic diagram of a simulation result of the sum-rate performance in accordance with one embodiment of the present disclosure.

Reference is made to FIG. 2. FIG. 2 is a schematic diagram of a simulation result of the sum-rate performance in accordance with one embodiment of the present disclosure. For convenience, abbreviate "channel state information at transmitter" as CSIT. FIG. 2 shows certain performance of three commonly considered precoding methods, namely, SLNR, BD, and SUB, each under two conditions: with perfect CSIT and with estimated CSIT using the present disclosure, assuming infinitely accurate CQI (to the extent achievable with double-precision floating-point computation). The performance with estimated CSIT is indistinguishable from that with perfect CSIT. And all are uniformly better than LTE-based codebook precoding without using the channel estimation of the present disclosure.

Figure 3:
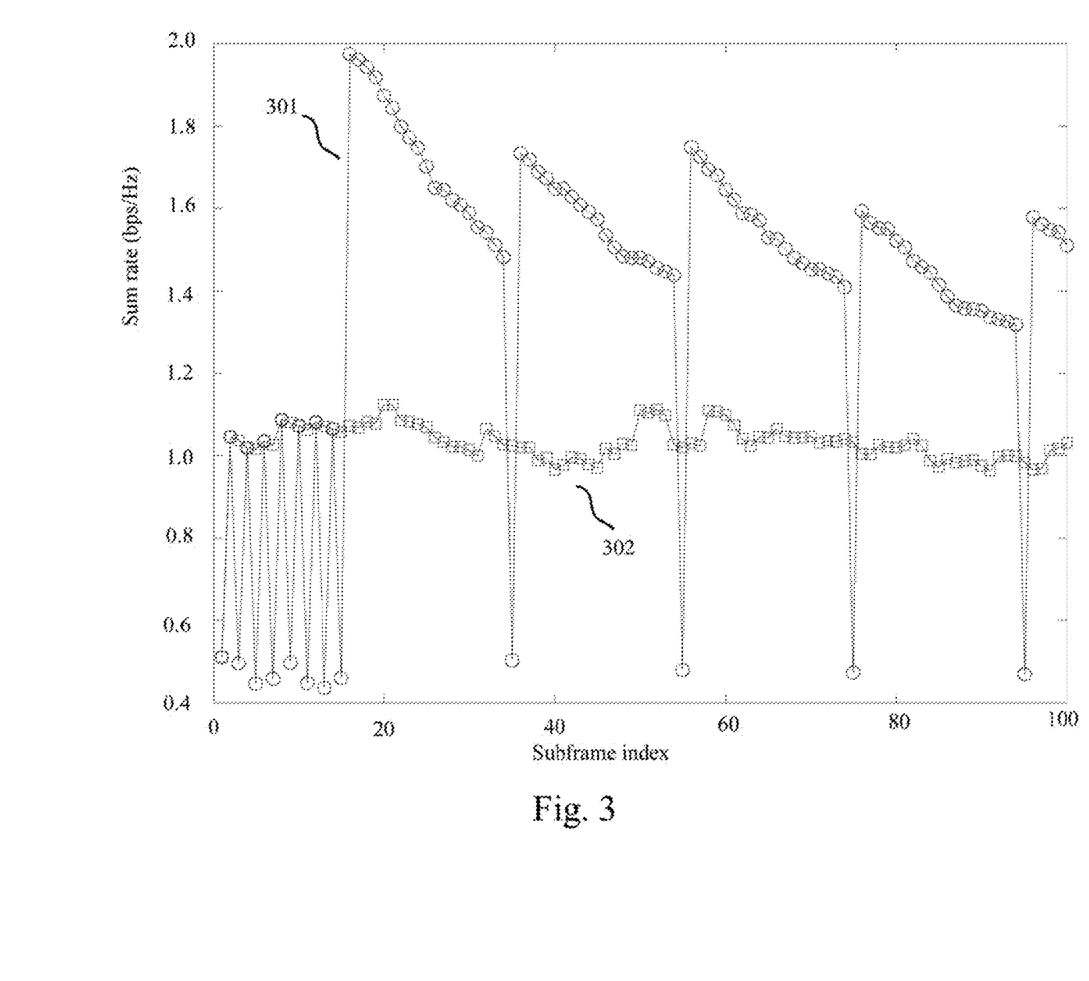
FIG. 3 is a schematic diagram of a simulation result of the sum-rate performance in accordance with one embodiment of the present disclosure.

Reference is made to FIG. 3. FIG. 3 is a schematic diagram of a simulation result of the sum-rate performance in accordance with one embodiment of the present disclosure. FIG. 3 shows certain performance of a particular precoding method (namely, SLNR) as a function of time in a time-variant channel, employing different channel estimates. The proposed channel estimating method (curve 301) is repeated once every few subframes to follow the channel time-variation, at infinitely accurate CQI. Its performance drops during the time when channel estimation is conducted, but then its performance rises above that employing directly the CSI fed back by the receiver for precoding (curve 302).

Figure 4:
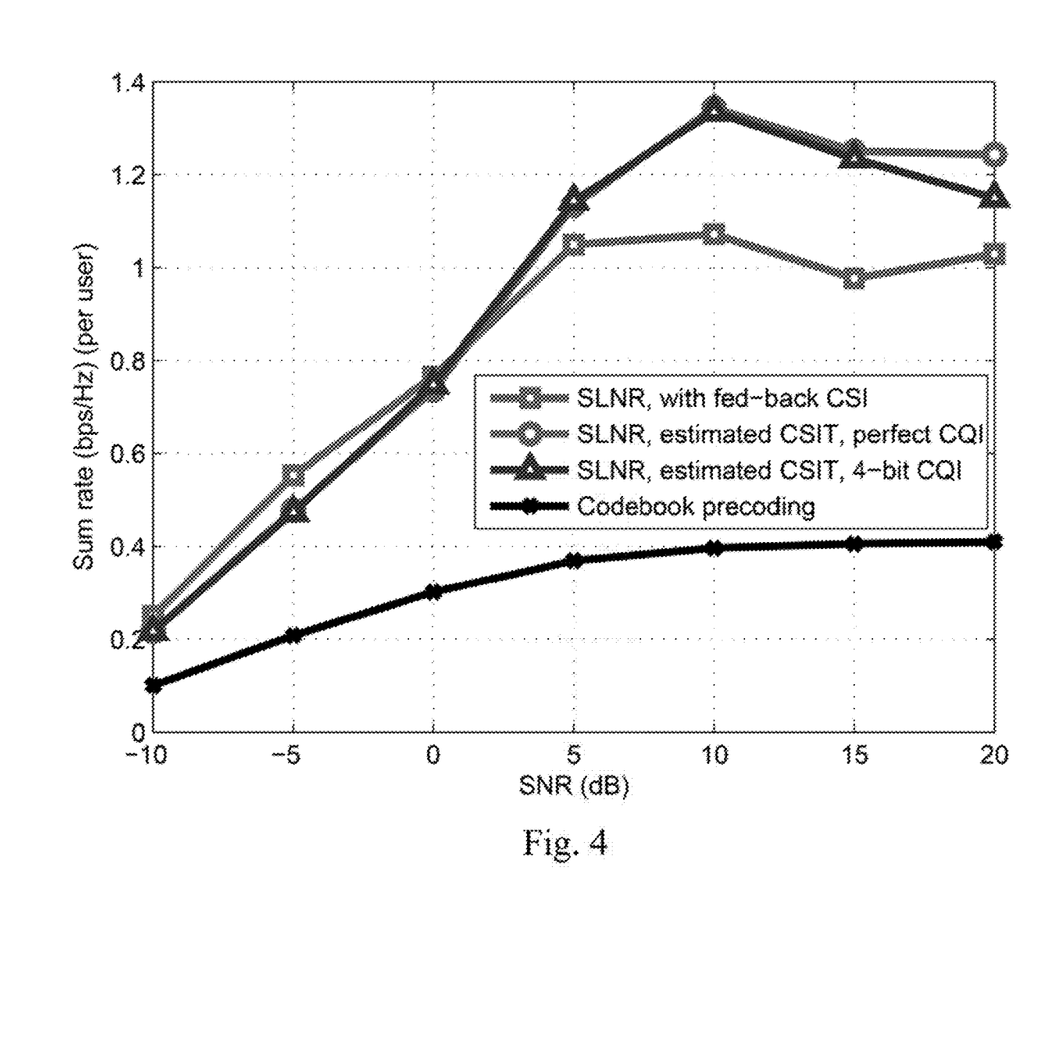
FIG. 4 is a schematic diagram of a simulation result of the sum-rate performance in accordance with one embodiment of the present disclosure.

Reference is made to FIG. 4. FIG. 4 is a schematic diagram of a simulation result of the sum-rate performance in accordance with one embodiment of the present disclosure. FIG. 4 shows certain performance of SLNR precoding under different conditions in a time-variant channel, averaged over time, as a function of the signal-to-noise ratio (SNR). Of particular interest is the top two curves which correspond to the present disclosure. One of them pertains to having infinitely accurate CQI and the other with 4-bit quantization (as in LTE). The two have yielded similar performance better than that employing directly the CSI fed back by the receiver for precoding. And all are uniformly better than LTE-based codebook precoding without using the channel estimation of the present disclosure.

The present disclosure also discloses a channel estimating method, and the channel estimating method may be implemented by the communication system 100 illustrated in FIG. 1, but is not limited in this regard. For convenience and clarity, it is assumed that the channel estimating method is implemented by the communication system 100 illustrated in FIG. 1.

The channel estimating method first conducts step 510, precoding at least one input signal with at least one precoding matrix for generating at least one precoded input signal.

Then the channel estimating method conducts step 520, transmitting the at least one precoded input signal.

Then the channel estimating method conducts step 530, receiving the at least one precoded input signal.

Then the channel estimating method conducts step 540, generating at least one channel quality signal corresponding to the at least one precoded input signal.

Then the channel estimating method conducts step 550, generating at least one channel state information estimate according to the at least one channel quality signal, the at least one precoding matrix, and at least one noise size signal.

Accordingly, the channel state information estimate can be obtained using the channel quality signal. The channel state information estimate may include magnitude information estimate and phase information estimate, and thus the transmission channel can be estimated.

Further, after conducting step 550, the communication system may optionally adjust at least one antenna setting for the transmission of the at least another input signal according to the channel state information estimate.

The above illustrations include exemplary operations, but the operations are not necessarily performed in the order shown. Operations may be added, replaced, changed order, and/or eliminated as appropriate, in accordance with the spirit and scope of various embodiments of the present disclosure.

By applying the techniques disclosed in the present disclosure, the channel state information estimate can be obtained using the channel quality signal. The channel state information estimate may include magnitude information estimate and phase information estimate, and thus the transmission channel can be estimated.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication system, comprising:
   at least one transmitting antenna, configured to precode at least one input signal with at least one precoding matrix for generating at least one precoded input signal, and transmit the at least one precoded input signal; and
   at least one receiving antenna wirelessly coupled with the at least one transmitting antenna, the at least one receiving antenna being configured to receive the at least one precoded input signal, and generate at least one channel quality signal corresponding to the at least one precoded input signal,
   wherein the at least one transmitting antenna generates at least one magnitude information estimate or at least one phase information estimate of at least one channel state information according to the at least one channel quality signal, the at least one precoding matrix and at least one noise size signal;
   wherein the at least one receiving antenna is further configured to generate at least one signal-to-interference-plus-noise ratio (SINR) according to the at least one precoded input signal, and the at least one SINR complies with a first formula:

$$Q_k[n] = \frac{\|H_k[n]p_k[n]\|^2}{\sigma_k^2 + \sum_{u=1, u \neq k}^{K} \|H_k[n]p_u[n]\|^2}$$

wherein n is an integer which is used to provide an index for the at least one input signal, k is an integer which is used to provide an index for the at least one receiving antenna, K is a number of the receiving antennas, $Q_k[n]$ is the SINR of the kth receiving antenna corresponding to the nth channel quality signal, $H_k[n]$ is the channel state information corresponding to the nth channel quality signal, $p_k[n]$ is the kth column of the nth precoding matrix, $p_u[n]$ is the uth column of the nth precoding matrix and $\sigma_k^2$ is the noise size signal, and the at least one receiving antenna may be further configured to quantize the at least one SINR to generate the at least one channel quality signal.

2. The communication system of claim 1, wherein the at least one precoding matrix comprises a first type precoding matrix, and the at least one transmitting antenna generates the at least one magnitude information estimate of the channel state information according to the at least one channel quality signal corresponding to the first type precoding matrix.

3. The communication system of claim 2, wherein the at least one transmitting antenna generates the at least one magnitude information estimate of the channel state information further according to at least one precoding matrix index (PMI) from the at least one receiving antenna.

4. The communication system of claim 2, wherein the communication system comprises N transmitting antennas and K receiving antennas, and each of the N transmitting antennas is configured to transmit N precoded input signals employing N first type precoding matrices, and each of the K receiving antennas is configured to generate N channel quality signals corresponding to the N precoded input signals, wherein N, K are integers bigger than 0.

5. The communication system of claim 2, wherein the communication system comprises N transmitting antennas wherein N is an integer bigger than 0, and the first type precoding matrix comprises an N×N matrix, and the N×N matrix complies with a formula:

$$P[n]=Q^n T_m$$

wherein P[n] is the first type precoding matrix, n is an index number, and Q, $T_m$ are N×N matrices.

6. The communication system of claim 1, wherein the at least one precoding matrix comprises a second type precoding matrix, and the at least one transmitting antenna generates the at least one phase information estimate of the channel state information according to the at least one channel quality signal corresponding to the second type precoding matrix.

7. The communication system of claim 6, wherein the at least one transmitting antenna generates the at least one phase information estimate of the channel state information further according to at least one precoding matrix index (PMI) from the at least one receiving antenna.

8. The communication system of claim 6, wherein the communication system comprises N transmitting antennas and K receiving antennas, and each of the N transmitting antennas is configured to transmit N precoded input signals employing N second type precoding matrices, and each of the K receiving antennas is configured to generate N channel quality signals corresponding to the N precoded input signals, wherein N, K are integers bigger than 0.

9. The communication system of claim 6, wherein the communication system comprises N transmitting antennas wherein N is an integer bigger than 0, and the second type precoding matrix comprises an N×N matrix, and the N×N matrix complies with a formula:

$$P[n]=(Q^n+Q^{n+1})T_p$$

wherein P[n] denotes the second type precoding matrix, n is an index number, and Q, $T_p$ are N×N matrices.

10. The communication system of claim 6, wherein the communication system comprises N transmitting antennas wherein N is an integer bigger than 0, and the second type precoding matrix comprises an N×N matrix, and the N×N matrix complies with a formula:

$$P[n]=(Q^n+jQ^{n+1})T_p$$

wherein P[n] denotes the second type precoding matrix, n is an index number, and Q, $T_p$ are N×N matrices.

11. A channel estimating method, suitable for a communication system, the channel estimating method comprises:

precoding at least one input signal with at least one precoding matrix for generating at least one precoded input signal;

transmitting the at least one precoded input signal;

receiving the at least one precoded input signal;

generating at least one channel quality signal corresponding to the at least one precoded input signal; and generating at least one magnitude information estimate or at least one phase information estimate of at least one channel state information according to the at least one channel quality signal, the at least one precoding matrix, and at least one noise size signal;

wherein the receiving of the at least one precoded input signal is performed by at least one receiving antenna and the at least one receiving antenna is further configured to generate at least one signal-to-interference-plus-noise ratio (SINR) according to the at least one precoded input signal, and the at least one SINR complies with a first formula:

$$Q_k[n] = \frac{\|H_k[n]p_k[n]\|^2}{\sigma_k^2 + \sum_{u=1,u\neq k}^{K} \|H_k[n]p_u[n]\|^2}$$

wherein n is an integer which is used to provide an index for the at least one input signal, k is an integer which is used to provide an index for the at least one receiving antenna, K is a number of receiving antennas, $Q_k[n]$ is the SINR of the kth receiving antenna corresponding to the nth channel quality signal, $H_k[n]$ is the channel state information corresponding to the nth channel quality signal, $p_k[n]$ is the kth column of the nth precoding matrix, $p_u[n]$ is the uth column of the nth precoding matrix and $\sigma_k^2$ is the noise size signal, and the channel estimating method may further comprise: quantizing the at least one SINR to generate the at least one channel quality signal.

12. The channel estimating method of claim 11, wherein the at least one precoding matrix comprises a first type precoding matrix, the channel estimating method further comprises:

generating the at least one magnitude information estimate of the channel state information according to the at least one channel quality signal corresponding to the first type precoding matrix.

13. The channel estimating method of claim 12, further comprising:

generating the at least one magnitude information estimate of the channel state information further according to at least one precoding matrix index (PMI) from at least one receiving antenna which does the receiving of the at least one precoded input signal.

14. The channel estimating method of claim 12, wherein the communication system comprises N transmitting antennas and K receiving antennas, and N, K are integers bigger than 0, the channel estimating method further comprises:

transmitting N precoded input signals employing N first type precoding matrices; and generating N channel quality signals for each of the K receiving antennas corresponding to the N precoded input signals.

15. The channel estimating method of claim 12, wherein the communication system comprises N transmitting antennas wherein N is an integer bigger than 0, and the first type precoding matrix comprises an N×N matrix, and the N×N matrix complies with a formula:

$$P[n]=Q^n T_m$$

wherein P[n] is the first type precoding matrix, n is an index number, and Q, $T_m$ are N×N matrices.

16. The channel estimating method of claim 11, wherein the at least one precoding matrix comprises a second type precoding matrix, the channel estimating method further comprises:

generating the at least one phase information estimate of the channel state information according to the at least one channel quality signal corresponding to the second type precoding matrix.

17. The channel estimating method of claim 16, further comprising:

generating the at least one phase information estimate of the channel state information further according to at least one precoding matrix index (PMI) from at least one receiving antenna which does the receiving of the at least one precoded input signal.

18. The channel estimating method of claim 16, wherein the communication system comprises N transmitting antennas and K receiving antennas, and N, K are integers bigger than 0, the channel estimating method further comprises:

transmitting N precoded input signals employing N second type precoding matrices; and generating N channel quality signals for each of the K receiving antennas corresponding to the N precoded input signals.

19. The channel estimating method of claim 16, wherein the communication system comprises N transmitting antennas wherein N is an integer bigger than 0, and the second type precoding matrix comprises an N×N matrix, and the N×N matrix complies with a formula:

$$P[n]=(Q^n+Q^{n+1})T_p$$

wherein P[n] is the second type precoding matrix, n is an index number, and Q, $T_p$ are N×N matrices.

20. The channel estimating method of claim 16, wherein the communication system comprises N transmitting antennas wherein N is an integer bigger than 0, and the second type precoding matrix comprises an N×N matrix, and the N×N matrix complies with a formula:

$$P[n]=(Q^n+jQ^{n+1})T_p$$

wherein P[n] is the second type precoding matrix, n is an index number, and Q, $T_p$ are N×N matrices.

* * * * *